Sept. 28, 1965      L. MASLOW      3,208,406

COUPLING CLIP

Filed May 3, 1963      2 Sheets-Sheet 1

INVENTOR.
LOUIS MASLOW
BY
Friedman & Goodman
ATTORNEYS

Sept. 28, 1965   L. MASLOW   3,208,406
COUPLING CLIP

Filed May 3, 1963   2 Sheets-Sheet 2

INVENTOR.
LOUIS MASLOW
BY
Friedman & Goodman
ATTORNEYS

United States Patent Office 3,208,406
Patented Sept. 28, 1965

3,208,406
COUPLING CLIP
Louis Maslow, Huntsville Road, Dallas, Pa.
Filed May 3, 1963, Ser. No. 277,924
3 Claims. (Cl. 108—64)

The present invention relates to further improvements in the construction of industrial shelving and other furniture such as cabinets, shelves, bookcases or the like which can be readily assembled from component parts dismantled or modified. Knockdown shelving units of the type to which the present invention relates are illustrated and disclosed in my United States Patent No. 2,919,817, issued on January 5, 1960, and in my co-pending applications Serial No. 126,709, filed on July 25, 1961, and Serial No. 262,102, filed on March 1, 1963.

The present invention is directed to frames of substantially similar construction which can be joined by a non-skilled person to form a variety of shelving units, which may be dismantled or modified. The shelving units may then be coupled, side by side, or end to end, in any desired arrangement. The means for coupling together a plurality of shelving units is constituted by a highly novel clip to which the present invention is directed.

In prior art devices of the type to which the present invention relates, it was not possible to couple together a plurality of such shelving units without utilizing relatively cumbersome and complicated devices which were relatively time consuming and expensive to apply.

In view of the foregoing, it is a primary object of the present invention to provide a highly novel arrangement for coupling together a plurality of knockdown shelving units which obviates the disadvantages present in prior art arrangements.

It is another object of the present invention to provide a coupling arrangement for shelving units of the described type, which is extremely simple and which is highly efficient in operation and which can be installed without special tools and without the necessity of possessing any mechanical skill or aptitude.

It is a further object of the present invention to provide a highly novel clip for coupling together in various different arrangements a plurality of shelving units.

It is a still further object of the present invention to provide such a clip which can be manufactured and sold at a relatively low price.

Other and further objects and advantages of the present invention will become readily apparent to those skilled in the art from a consideration of the following specification taken in connection with the appended drawings which illustrate the best mode presently contemplated for carrying out the invention.

Figure 1:
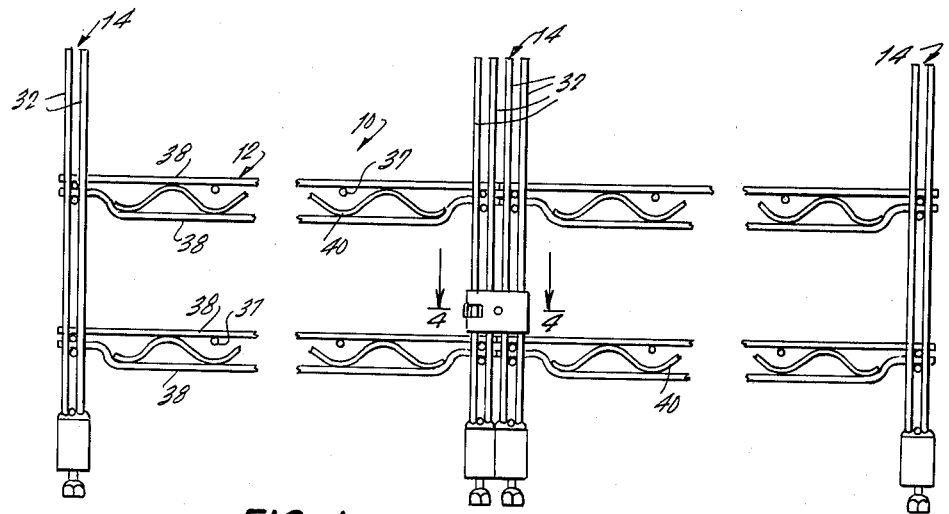
FIGURE 1 is a more or less schematic illustration of a pair of knockdown shelving units assembled in end to end relation pursuant to the present invention.

Referring now to the drawings in detail, there is shown a knockdown shelving unit 10 of the type illustrated and described in my previously identified patent and patent applications. The shelving unit 10 is constituted by a shelf or frame component 12 which is supported between a pair of support or frame components 14. The frame or shelf 12 comprises spaced ribs 36 secured to transverse rods 37. As best shown in FIGURE 1, the front and rear edges of the frame comprise pairs of spaced ribs 38 and 39 which are closely spaced adjacent the ends of the frame and more widely spaced in parallel relation along the central portion thereof. The pairs of spaced ribs 38 and 39 are further provided with a truss-like reinforcement in the form of a sinuously bent wire 40 which is secured to the upper and lower members or ribs 38 and 39 at abutting points thereof as by welding. The longitudinal edges of the frame are thus substantially reinforced against bending stresses and a more rigid assembly is achieved wherein considerably greater weights may be supported over substantially increased stands. The rods 36 are welded to the upper surfaces of the transverse ribs 37. However, at each of the opposite ends of the shelf frame 12, provision is made for an additional transverse rod 41 which is welded to the lower surfaces of the ribs 36. The exterior edges of the ribs 38 and 39 are provided at their respective ends with curvate pairs of notches 26, 27, 28 and 29 which provide means for securing the frame 12 to transverse supporting frames 14 as will be disclosed.

The supporting frames 14 each comprise pairs of vertical supports 32 and 33 which are interconnected with a pair of spaced horizontal stiffeners 34 and with a third horizontal stiffener 74 having an upward bow 72, which form transverse supports for the shelves. The stiffeners are interconnected by vertical supporting struts 15. The space separating the pairs of supports 32 and 33 is smaller than the overall width of the shelf frame 12. That is, the out-to-out dimension from the ribs 38 to the ribs 39 is greater than the space separating the inner surfaces of the supports 32 and 33. Consequently, the notches 26, 27, 28 and 29 are made large enough to permit the insertion of the frame between the supports 32 and 33 of the supporting frame members 14.

Each of the horizontal stiffeners 34 of the support frames 14 is provided centrally thereof with an integral U-shaped portion 18. The U-shaped portions 18 form expansion elements or beams within the horizontal stiffeners 34 so that when the shelf elements 12 are associated or mounted by the end supports 14, as hereinafter described in detail, the expansion means 18 will expand slightly so as to increase the lateral distance between the horizontal supports 32 and 33 to facilitate the full movement of the shelf element 12 to its normal horizontal position. When the element 12 reaches its normal horizontal position, the expansion means 18 will compress somewhat or reduce its horizontal dimension so as to provide the necessary compressive force to effect a secure coupling between the shelf frames 12 and the support frames 14.

Each shelving unit 10 is also provided with an adjustable leg assembly 68 having an adjustable leg 70 to adjust the height thereof.

Figure 2:
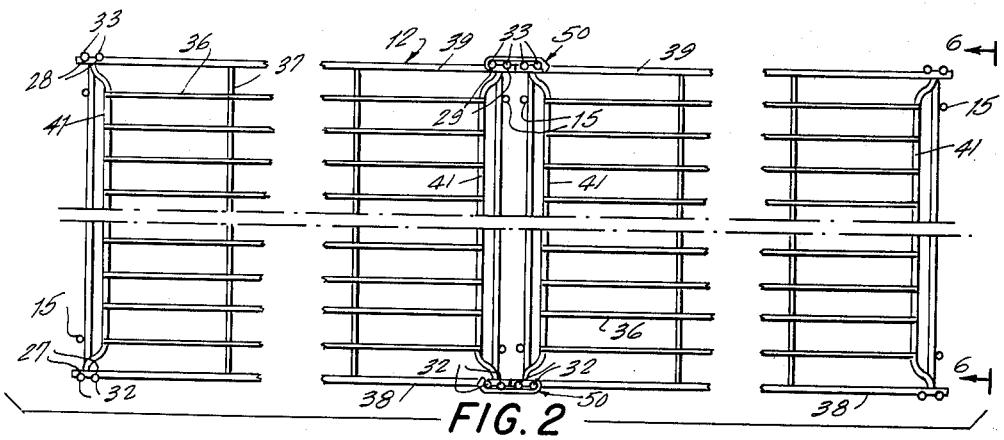
FIGURE 2 is a top plan view of FIGURE 1.
Figure 3:
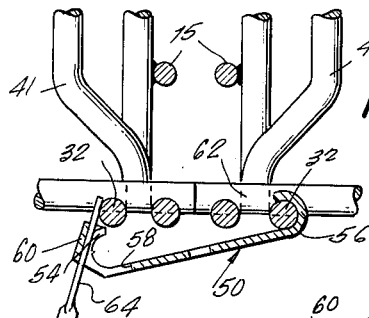
FIGURE 3 is a view similar to FIGURE 4 and illustrates the manner in which a clip, pursuant to the present invention, is mounted on a pair of shelving units which are disposed in end to end relation.
Figure 5:
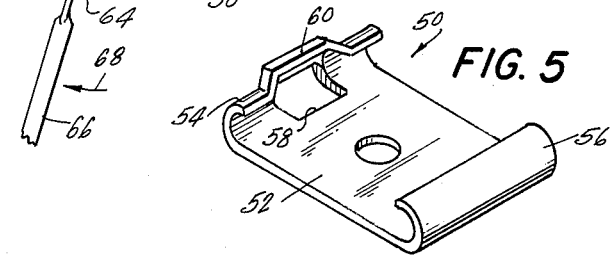
FIGURE 5 is a perspective view of a clip pursuant to the present invention.
Figure 6:
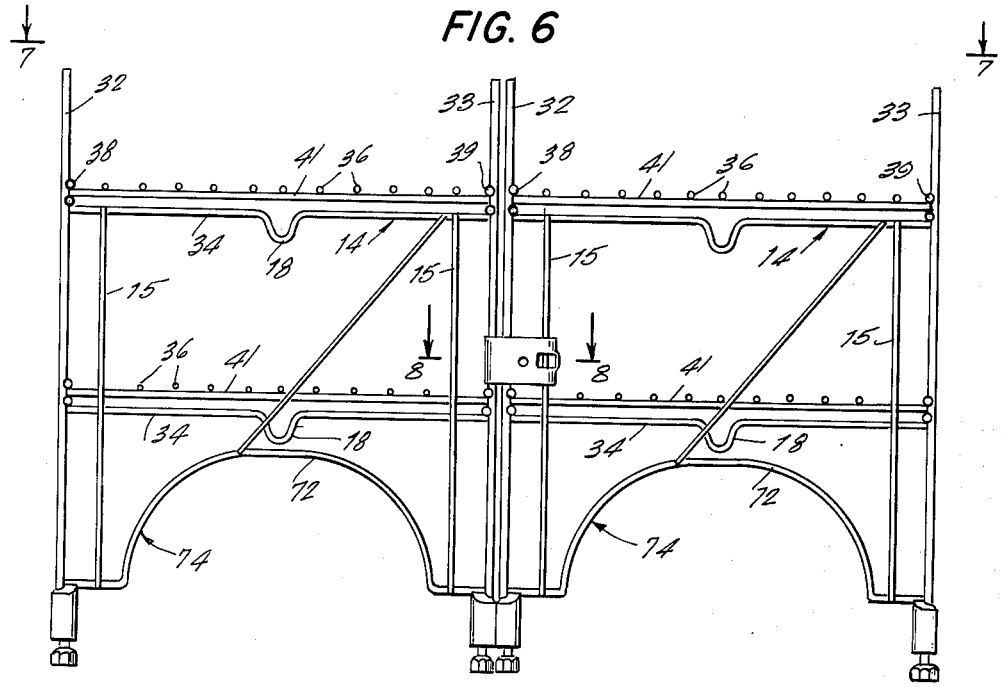
FIGURE 6 is a more or less schematic illustration of a pair of knockdown shelving units assembled in side by side relation pursuant to the present invention.
Figure 7:
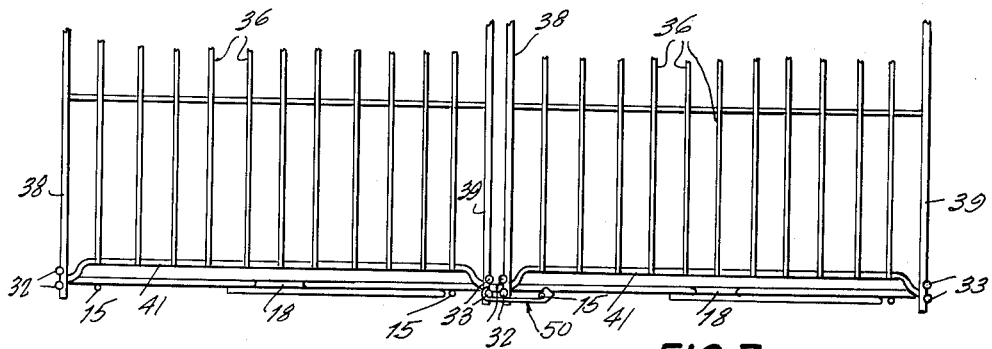
FIGURE 7 is a top plan view of FIGURE 6.

Prusuant to the present invention, provision is made to secure a plurality of shelving units either in end to end relation, as shown in FIGURES 1 and 2, or in side by side relation, as shown in FIGURES 6 and 7. For this purpose there is provided a clip 50, as best shown in FIGURE 5. The clip 50 is formed of any suitable material, preferably steel.

As here shown, the clip 50 is a channel shaped member having a base 52 provided with the inturned confronting ends 54 and 56. A cut-out 58, which is defined in base 52, extends partially into end portion 54. End portion 54 is provided also with an off-set portion 60 which is contiguous with the cut-out 58. Said cut-out and contiguous off-set are utilized both in mounting the clip on a pair of shelving units and in removing the clip therefrom.

Figure 4:
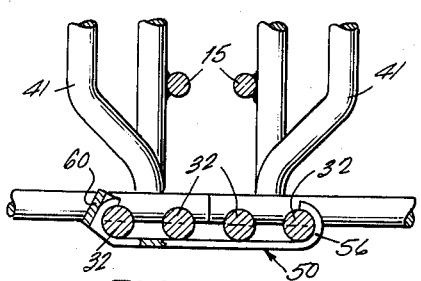
FIGURE 4 is a fragmentary sectional view, on an enlarged scale, taken on line 4—4 of FIGURE 1.

In order to secure a pair of shelving units 10 in end to end relation, as shown in FIGURES 1 and 2, a pair of such units are disposed so that an end support 14 at the end of one unit abuts end support 14 at the adjacent end of the other unit. This will align the vertical supports 32 and 33 of the abutting end supports with the result that four vertical supports 32 are aligned at one side of the paired shelving units and four vertical supports 33 are aligned at the other side of the paired shelving units, as best seen in FIGURES 1–4. A clip 50 is then mounted on each set of four vertical supports. This is accomplished by first engaging the inturned end 56 on one of the outermost vertical supports. In FIGURE 4, the semicircular inturned end 56 is engaged on the rightmost vertical support 32, viewing said figure, and the clip is pivoted thereon toward the assembled units, as indicated by arrow 62 until it engages the leftmost vertical support 32. The blade 64 of a screw driver 66, or similar tool, is then inserted through the cut-out 58 so that the blade bears against the inner surface of off-set 60 and the point of the blade bears against the leftmost vertical support 32. The screw driver is then urged in the direction of the arrow 68 so that the blade bears against both the off-set 60 and the support 32. Due to the inherent resiliency of the support 32, the inturned end 54 will snap-engage over the leftmost vertical support and assume the position thereof shown in FIGURE 3. It will be understood that the normal distance between the opposite surface points on the two outer supports 32 exceeds the distance between the confronting surfaces of inturned ends 54 and 56 with the result that said two supports are resiliently urged together and the clip 50 is secured in position by the resulting spring tension. A pair of clips 50, mounted on opposite sides of the assembled shelving units, as shown in FIGURE 2, will retain the latter in assembled relation. When it is desired to separate the two units, the tool 66 can be reinserted in the cut-out of each clip to disengage the latter, as will be readily apparent.

Figure 8:
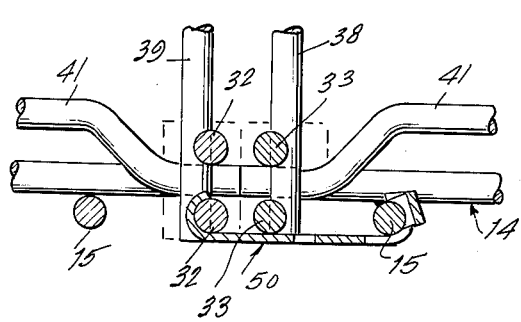
FIGURE 8 is a fragmentary sectional view, on an enlarged scale, taken on the line 8—8 of FIGURE 6.

In order to secure a pair of units 10 in side by side relation, the units are first disposed in said relation. This will dispose a pair of end supports 14 in side by side relation, as shown, so that the vertical support 32 of one end support 14 is adjacent to the vertical support 33 of the other end support, with the vertical strut 15 of each end support adjacent to its associated verical support, as illustrated. Clip 50 is dimensioned so that it can engage on either vertical strut 15 and the associated pair of adjacent vertical supports 32 and 33 as shown in FIGURES 6–8. It will be apparent therefore that the clip can be engaged on either strut 15 at the adjacent ends of the end supports so as to encompass the adjacent vertical supports. The clip can be secured in position in the same manner as previously described and the inherent resiliency of the struts and vertical supports will facilitate both the engagement and disengagement of the clips at both ends of a pair of units 10 which are disposed as in FIGURES 6 and 7.

It will be understood that the clips 50 can be utilized to secure additional units 10 either in end to end or in side by side relation.

While I have illustrated and described the presently preferred embodiment of the invention, it will be readily apparent that various changes and modifications may be made therein without however departing from the spirit and scope thereof as set forth in the appended claims.

I claim:
1. A shelving assembly comprising a pair of shelving units, each unit comprising a horizontal shelf and a pair of spaced vertical frame supports mounting said shelf, said units being disposed in end to end relation so that one vertical support of one of said units is contiguous with one vertical support of the other of said units, and clip means releasably securing together said contiguous vertical supports, said vertical supports each having two pairs of vertically extending support elements, the two elements of each pair being in lateral alignment, the vertical elements of each of said contiguous frame supports being in lateral alignment with the vertical elements of the other of said contiguous frame supports to provide two pairs of four vertically aligned elements at said contiguous frame supports, said clip means comprising one clip engaged on each pair of said four vertically aligned elements, said vertical elements being constituted by vertical rods, said clips being channel members having confronting inturned ends engaged on the outermost rods of each pair of four rods, each clip having a cut-out adjacent and extending inwardly of one inturned end thereof, and said one end having an outwardly off-set portion, whereby a tool may be inserted through said cut-out for engagement with said off-set portion and one of said outermost rods to engage and disengage the clip from its associated rods.

2. A shelving assembly comprising a pair of shelving units, each comprising a horizontal shelf and a pair of spaced vertical frame supports mounting said shelf, said units being disposed in side by side relation so that the vertical supports of said units are in contiguous relation at the adjacent sides of said units, and clip means releasably securing together said contiguous vertical supports, said vertical supports each having a pair of vertically extending elements which are in lateral alignment with a similar pair of vertically extending elements of the other support at the ends of the adjacent sides of said units, said clip means comprising one clip engaged on three of the vertical elements of at least one set of two laterally aligned pairs thereof, each clip having a cut-out adjacent and extending inwardly of one inturned end thereof, and said one end having an outwardly offset portion, whereby a tool may be inserted through said cut-out for engagement with said offset portion and an outer one of said elements to engage and disengage the clip from its associated elements.

3. A clip for securing together a pair of shelving units, said clip being a channel member having a base portion and confronting inturned ends underlying said base portion, means defining a cut-out extending into said base portion from one of said inturned ends, and said one end having an outwardly offset portion, whereby a tool may be inserted through said cut-out for engagement with said off-set portion to facilitate the engagement of said clip with and the disengagement of said clip from a pair of shelving units.

References Cited by the Examiner
UNITED STATES PATENTS

| | | | |
|---|---|---|---|
| 2,074,475 | 3/57 | Jesser | 248—226.5 |
| 2,430,754 | 11/47 | Belanger | 24—21 |
| 2,919,817 | 1/60 | Maslow | 211—182 |
| 2,970,702 | 2/61 | Maslow | 108—153 |
| 3,091,487 | 5/63 | Gallagher et al. | |

FOREIGN PATENTS 642,498   9/50   Great Britain.

FRANK B. SHERRY, *Primary Examiner.*